(12) United States Patent
Masumoto et al.

(10) Patent No.: US 7,668,381 B2
(45) Date of Patent: Feb. 23, 2010

(54) DECODING APPARATUS AND ENCODING APPARATUS WITH SPECIFIC BIT SEQUENCE DELETION AND INSERTION

(75) Inventors: Masayuki Masumoto, Sakai (JP); Kazushi Kurata, Takatsuki (JP); Hideyo Tsuruta, Katano (JP)

(73) Assignee: Panasonic Corporation, Osaka (JP)

( * ) Notice: Subject to any disclaimer, the term of this patent is extended or adjusted under 35 U.S.C. 154(b) by 749 days.

(21) Appl. No.: 11/253,683

(22) Filed: Oct. 20, 2005

(65) Prior Publication Data

US 2006/0101484 A1 May 11, 2006

(30) Foreign Application Priority Data

Oct. 22, 2004 (JP) .............................. 2004-308796

(51) Int. Cl.
 *G06K 9/36* (2006.01)
(52) U.S. Cl. .................. 382/232; 725/25; 711/112; 712/210
(58) Field of Classification Search ................ 382/232, 382/246; 711/112; 712/210; 725/25
 See application file for complete search history.

(56) References Cited

U.S. PATENT DOCUMENTS

| 5,822,552 | A | 10/1998 | Shim |
| 6,687,768 | B2 | 2/2004 | Horikomi et al. |
| 2001/0036323 | A1* | 11/2001 | Chui ........................ 382/276 |
| 2002/0004862 | A1 | 1/2002 | Horikomi et al. |
| 2002/0034332 | A1 | 3/2002 | Ueki |

FOREIGN PATENT DOCUMENTS

| DE | 197 47 888 | 1/1999 |
| JP | 06-069812 | 3/1994 |
| JP | 7-86956 | 3/1995 |
| JP | 2002-26854 | 1/2002 |
| JP | 2003-198378 | 7/2003 |
| JP | 2004-247926 | 9/2004 |

OTHER PUBLICATIONS

CCITT; Information technology—Digital Compression and Coding of Continuous-tone Still Images—Requirements and Guidelines; The International Telegraph and Telephone Consultative Committee;T.81, Sep. 1992; pp. 1-186.*
Heinrich, Beck, "*Datenkommunikation, Internet and Multimedia Kapitel 6 Data Link Layer—Zugangsnetze*", Internet Article, 'Online!, Apr. 24, 2002, XP002369224.

* cited by examiner

*Primary Examiner*—Vikkram Bali
*Assistant Examiner*—Eueng-Nan Yeh
(74) *Attorney, Agent, or Firm*—Wenderoth, Lind & Ponack, L.L.P.

(57) ABSTRACT

The decoding apparatus in the present invention includes a memory operable to hold encoded data representing one of a compressed sound and a compressed image, a memory read-out unit operable to sequentially read out the encoded data from said memory, a match determining circuit operable to determine whether or not data matching a specific bit sequence exists in the encoded data read out by said memory read-out unit, a deleting circuit operable to delete a part of the specific bit sequence from the encoded data read out from said memory, when said match determining circuit determines that the specific bit sequence exists, and a decoding circuit operable to decode the post-deletion encoded data.

7 Claims, 16 Drawing Sheets

US 7,668,381 B2

DECODING APPARATUS AND ENCODING APPARATUS WITH SPECIFIC BIT SEQUENCE DELETION AND INSERTION

BACKGROUND OF THE INVENTION (1) Field of the Invention

The present invention relates to a decoding apparatus which performs decoding of encoded data and an encoding apparatus which performs encoding, in data compression and data expansion of audio and image.

(2) Description of the Related Art

Conventionally, in a decoding apparatus which decodes sound, image and so on, encoded data is outputted to an inverse quantization unit after being decoded in a fixed-length decoding unit and a variable-length decoding unit, as shown in Japanese Laid-Open Patent Application No. 6-69812 (Section 5, FIG. 1), for example. Furthermore, in an encoding apparatus which performs encoding, quantized data is encoded by a fixed-length encoding unit and a variable-length encoding unit, and compressed data is outputted.

Furthermore, in general, a decoding apparatus which performs fixed-length decoding and variable-length decoding is structured in the manner shown in FIG. 1. The decoding apparatus in the diagram includes a processor 900, an input data memory 910, and input data memory I/F 920, a decoding circuit 930, an output data memory 940, and an output data memory I/F 950.

The processor 900 accesses the input data memory 910 in order to perform the processing of encoded data stored in the input data memory 910. The processing of data described here includes the deletion of a marker. In the case of JPEG, various markers are defined, as markers indicate the existence of a header or a table. A marker is a specific bit sequence such as "FF", and indicates that the 1-byte data following it is not data, but a control code. In the decoding of encoded data, when a specific bit sequence identical to the marker exists within the encoded data, distinguishing data (for example, "00") indicating that such specific bit sequence is not a marker is added. For example, although the "FF" in "FF01" within the encoded data is a marker, "FF" in "FF00" is not a marker, but data. The processor 900 deletes such distinguishing data as "00".

The decoding circuit 930 outputs a data request signal to the input data memory I/F 920 in order to read the data to be decoded, from the input data memory 910.

In the case where accessing by the processor 900 and the decoding circuit 930 conflict, the input data memory I/F 920 permits the accessing by one side, and places the accessing of the other on stand-by.

Upon reading the data to be decoded from the input data memory 910, the decoding circuit 930 carries out the decoding, outputs the result to the output data memory 940, and outputs, to the output data memory I/F 950, a data output signal indicating that the output data is valid.

The output data memory I/F 950 outputs the write address to the output data memory 940.

Thus the decoding apparatus which decodes the data in the input data memory 910 and stores the result in the output data memory 940 operates in such manner.

In the conventional decoding apparatus, the processor deletes the distinguishing data indicating a non-marker, and writes the result in the input data memory, after which the decoding circuit performs decoding and the decoded result is outputted to the output data memory. Because the deletion of the distinguishing data indicating a non-marker is performed using the processor, input and output between the memory and the processor, as well as the deletion performed by the processor become a necessity, so there exists the problem of deterioration of decoding performance.

SUMMARY OF THE INVENTION

The present invention has as an objective to provide a decoding apparatus and an encoding apparatus which process deletion and insertion of distinguishing data which distinguishes a marker, without entailing deterioration of processing performance.

In order to solve the aforementioned problem, the decoding apparatus in the present invention includes a memory operable to hold encoded data representing one of a compressed sound and a compressed image, a memory read-out unit operable to sequentially read out the encoded data from said memory, a match determining circuit operable to determine whether or not data matching a specific bit sequence exists in the encoded data read out by said memory read-out unit, a deleting circuit operable to delete a part of the specific bit sequence from the encoded data read out from said memory, when said match determining circuit determines that the specific bit sequence exists, and a decoding circuit operable to decode the post-deletion encoded data.

According to this structure, as the need for the processor to perform the deletion of a part of the specific bit sequence (for example, distinguishing data indicating a non-marker) is eliminated, the input and output of data between the memory and the processor, as well as the deletion performed by the processor are eliminated. Therefore, the deterioration of the operating speed of the decoding circuit can be prevented.

Here, it is possible to have a structure in which the decoding apparatus further includes a header determining circuit operable to determine a type of the encoded data, based on a header included in the encoded data read out from said memory, wherein said match determining circuit is operable to change a bit pattern of the specific bit sequence depending on the type of the encoded data determined by said header determining circuit.

According to this structure, even in the case where the part of the specific data is different depending on the type of the encoded data, the header determining circuit distinguishes the type of the encoded data and based on the result, sets the data to be compared and the data to be deleted in a combination determined for each type of encoded data. Therefore, the header analysis, and the setting, to the decoding circuit, of changes in the data to be compared and data to be deleted, performed by the processor are eliminated, so the deterioration of the operating speed of the decoding circuit can be prevented.

Here, it is possible for the decoding apparatus to further include a size determining circuit operable to determine a size of the header included in the encoded data read out from said memory, wherein said memory read-out unit is operable to update, depending on the size, a read address so as to skip the header, the size being determined by said size determining circuit.

According to this structure, as header data, within the encoded data, which does not require decoding, need not be inputted to the decoding circuit, the encoded data processing speed of the decoding circuit improves.

Here, it is possible to have a structure in which the decoding apparatus further includes a holding circuit placed between said deleting circuit and said decoding circuit, and operable to temporarily hold the post-deletion encoded data, wherein said memory read-out unit is operable to read out the encoded data on a first bus width basis, an input bus width of said decoding circuit is a second bus width which is narrower than the first bus width, and said holding circuit is operable to hold the post-deletion encoded data, to adjust the held encoded data to the second bus width, and to output the adjusted encoded data to said decoding circuit.

According to this structure, even in the case where distinguishing data has been deleted from the encoded data, there is no shortage in the input of the decoded data to the decoding circuit, and deterioration of throughput due to data shortage can be prevented.

Here, it is possible to have a structure in which the decoding apparatus further includes a size determining circuit operable to determine a size of a header included in the encoded data read out from said memory, wherein said holding circuit is further operable to delete the header from the held encoded data, depending on the size determined by said size determining circuit.

According to this structure, at the same time as the header determination, it is possible to skip the header data in the encoded data, which does not require decoding, and input the encoded data following the header data into the decoding circuit. Therefore, the encoded data processing speed of the decoding circuit improves and deterioration of throughput in the decoding process can be prevented.

Here, it is possible to have a structure in which the specific bit sequence includes a first bit sequence and a second bit sequence which is added to the first bit sequence, and said deleting circuit is operable to delete the second bit sequence.

Here, said match determining circuit may include a first comparison device operable to compare the encoded data with the first bit sequence on a first predetermined size basis, the encoded data being read out from said memory, a second comparison device operable to compare the encoded data with the second bit sequence on a second predetermined size basis, the encoded data being read out from said memory, and a register operable to hold at least a part of a comparison result, from said first comparison device, for encoded data read out one cycle earlier.

Here, said deleting circuit may include a distinguishing circuit operable to distinguish the specific bit sequence from comparison results from said first comparison device and said second comparison device, and the comparison result held by said register, and a selecting circuit operable to partially select and output the encoded data, so as to exclude the second bit sequence from the distinguished specific bit sequence, the encoded data being read out from said memory.

Furthermore, the encoding apparatus in the present invention includes a first memory operable to hold data to be encoded, a memory read-out unit operable to sequentially read out the data to be encoded from said first memory, an encoding circuit operable to encode the data read out from said first memory, a match determining circuit operable to determine whether or not data matching a specific bit sequence exists in the encoded data outputted by said encoding circuit, an adding circuit operable to add a predetermined bit sequence to the encoded data outputted by said encoding circuit, when said match determining circuit determines that the specific bit sequence exists, and a second memory operable to store the post-addition encoded data.

According to this structure, as the need for the processor to perform the insertion, into the encoded data, of distinguishing data indicating a non-marker, is eliminated, the input and output of data between the memory and the processor, as well as the insertion performed by the processor are eliminated. Therefore, the deterioration of the operating speed of the encoding circuit can be prevented.

Here, it is possible that a bus width of said second memory is greater than an output bus width of said encoding circuit, and said adding circuit is operable to hold the encoded data outputted by said encoding circuit, and to adjust the size of the held encoded data to the bus width of said second memory.

According to this structure, even in the case where data is inserted into the encoded data, the data bus outputting to the memory which holds the encoded data does not run out of data, and deterioration of encoding throughput caused by waiting for the transmission of data can be prevented.

According to the above-described decoding apparatus and encoding apparatus in the present invention, it is possible to execute the processes of deletion and insertion of distinguishing data which distinguishes markers and data, without entailing deterioration of processing performance.

FURTHER INFORMATION ABOUT TECHNICAL BACKGROUND TO THIS APPLICATION

The disclosure of Japanese Patent Application No. 2004-308796 filed on Oct. 22, 2004, including specifications, drawings and claims, is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings.

DESCRIPTION OF THE PREFERRED EMBODIMENT(S)

First Embodiment

Figure 1:
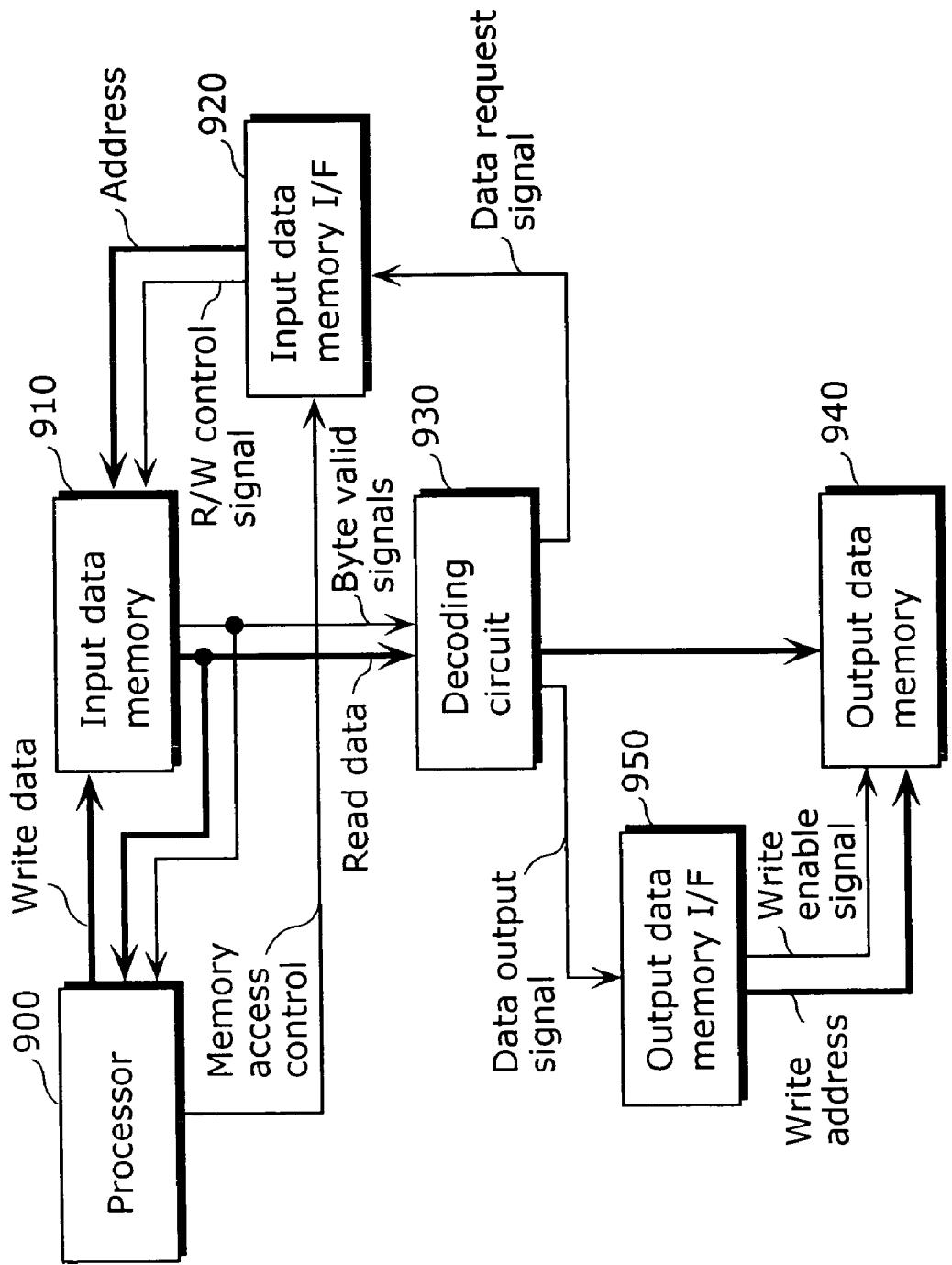
FIG. 1 shows an example of the conventional decoding apparatus.
Figure 2:
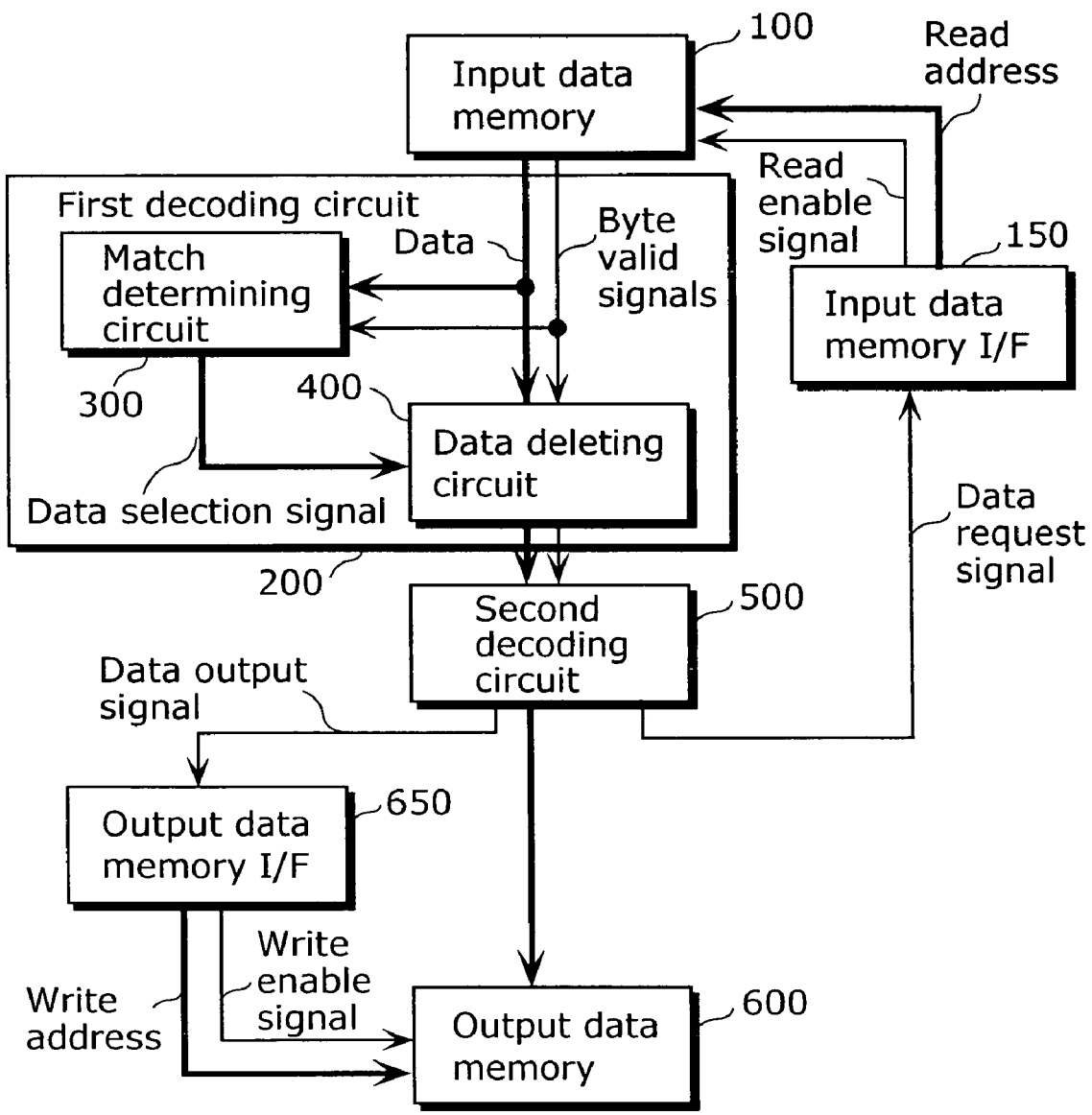
FIG. 2 shows the decoding apparatus in the first embodiment.

FIG. 2 is a diagram showing the structure of the decoding apparatus in the first embodiment of the present invention. The decoding apparatus includes an input data memory 100, and input data memory I/F 150, a first decoding circuit 200, a match determining circuit 300, a data deleting circuit 400, a second decoding circuit 500, an output data memory 600, an output data memory I/F 650. The first decoding circuit 200 includes the match determining circuit 300 which compares data, as well as the data deleting circuit 400 which deletes specific data and outputs the post-deletion encoded data to the second decoding circuit 500. The specific data referred to here is distinguishing data (assumed in the present embodiment as the "00" immediately following "FF") for distinguishing a marker and data.

The input data memory 100 stores encoded data. The input data memory I/F 150 outputs a read enable signal and a read address to the input data memory 100, in accordance with a data request signal from the second decoding circuit 500. The input data memory 100 receives the read enable signal and read address from the input data memory I/F 150, and outputs, to the first decoding circuit 200, data and byte valid signals, each of which are a valid signal for each byte.

The first decoding circuit 200 receives the data and the byte valid signals from the input data memory 100, and outputs, to the second decoding circuit 500, the data after specific data has been deleted, and the byte valid signals. As the first decoding circuit 200 operates at a higher speed than the deletion performed by the processor, the operating speed of the decoding apparatus can be improved.

The first decoding circuit 200 is made up of the match determining circuit 300 and the data deleting circuit 400. The match determining circuit 300 (a) receives the data and the byte valid signals from the input data memory 100, (b) obtains, by data comparison, the data to be deleted, and (c) outputs, to the data deleting circuit 400, a data selection signal indicating which data to delete and which data to validate.

The data deleting circuit 400 receives the data and the byte valid signals from the input data memory 100 and, in accordance with the data selection signal inputted from the match determining circuit 300, outputs, to the second decoding circuit 500, the data deleted of the specific data.

The second decoding circuit 500 outputs the decoding result data to the output data memory 600, and outputs, to the output data memory I/F 650, a data output signal which indicates that the decoding result data is valid.

The output data memory I/F 650 outputs a write enable signal and a write address to the output data memory 600, in accordance with the data output signal outputted by the second decoding circuit 500.

Figure 3:
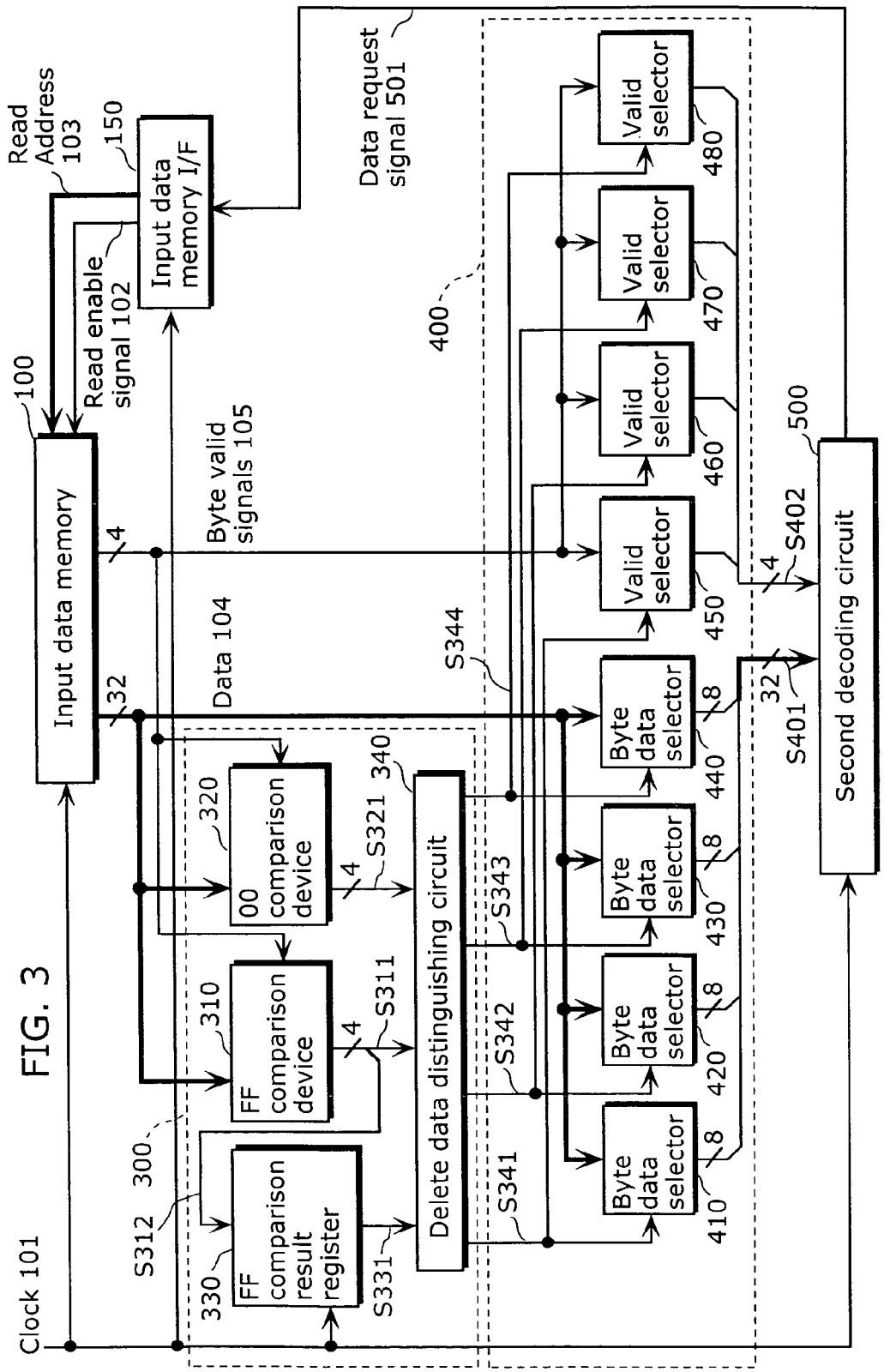
FIG. 3 is a structure diagram of the first decoding circuit.

FIG. 3 is a diagram showing the detailed structure of the match determining circuit 300 and the data deleting circuit 400 within the first decoding circuit 200, as well as showing the input data memory 100 and the second decoding circuit 500.

As shown in the diagram, the match determining circuit 300 includes: an FF comparison device 310 which performs "FF" comparisons; a 00 comparison device 320 which performs "00" comparisons; an FF comparison result register 330 which holds a result of a data "FF" comparison; and a delete data distinguishing circuit 340. In addition, the data deleting circuit 400 includes byte data selectors 410, 420, 430 and 440, and valid selectors 450, 460, 470 and 480 which select byte valid signals. The following are shown for the signal lines in FIG. 3: a clock signal 101; a read enable signal 102; a read address 103; data 104 outputted by the input data memory 100; byte valid signals 105 outputted by the input data memory 100; a signal S311 representing a data "FF" comparison result, outputted by the FF comparison device 310; a signal S312 representing the least significant bit of the signal S311 representing the data "FF" comparison result; a signal S321 representing a result of a data "00" comparison, outputted by the 00 comparison device 320; a signal S331 representing the output of the FF comparison result register 330; data selection signals S341, S342, S343 and S344 outputted by the delete data distinguishing circuit 340; a signal S401 which bundles together the outputs from the byte data selectors 410, 420, 430 and 440; and a signal S402 which bundles together the outputs from the valid selectors 450, 460, 470 and 480.

The FF comparison device 310 compares, with the "FF", each byte of the 4-bytes of encoded data read out from the input data memory 100, and outputs the 4-bit signal S311 representing the comparison result indicating a match or otherwise, for each byte of the 4-bytes.

The 00 comparison device 320 compares, with the "00", each byte of the 4-bytes of encoded data read out from the input data memory 100, and outputs the 4-bit signal S321 representing the comparison result indicating a match or otherwise, for each byte of the 4-bytes.

The FF comparison result register 330 holds the least significant bit of the signal S311 representing the comparison result, outputted by the FF comparison device 310 one cycle earlier. This is used for detecting cases where the "FF" and "00" straddle the borders of the 32 bit data read out from the input data memory 100.

In the case where an "FF00" bit pattern is detected from 32-bit data read out from the input data memory 100, based on the comparison result signal S311 outputted by the FF comparison device 310, the comparison result signal S321 outputted by the 00 comparison device 320, and the output signal S331 of the FF comparison result register 330, the delete data distinguishing circuit 340 distinguishes the "00" following (adjoining on the low-side of) such "FF", and controls the output value for the data selection signals S341, S342, S343 and S344 so as to delete such "00". At this point, in the case where, according to the output signal S331 of the FF comparison result register 330, the lowest byte of the 32-bit data read out from the input data memory 100 in the previous cycle is "FF", and the highest byte of the 32-bit data in the current cycle is "00", the delete data distinguishing circuit 340 controls the output value of the data selection signals S341, S342, S343 and S344 so as to delete such "00".

Figure 4:
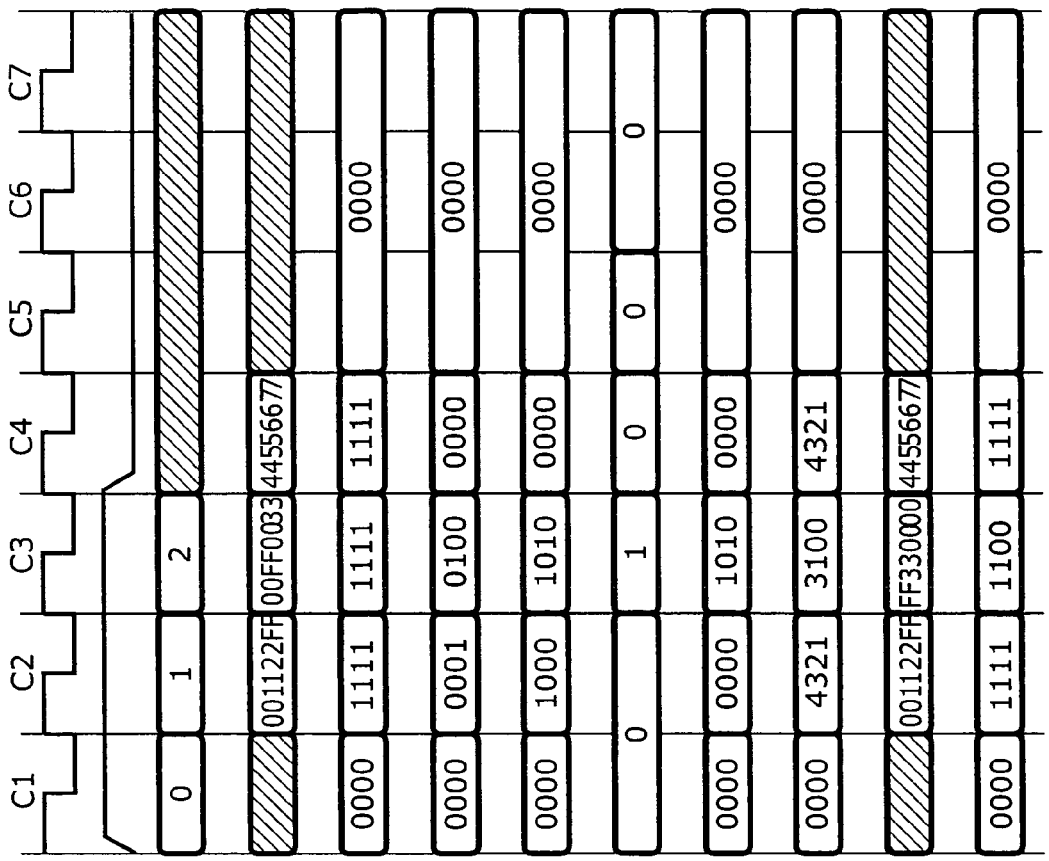
FIG. 4 is a decoding operation timing diagram.

The operation of the decoding apparatus in FIG. 3 shall be described using FIG. 4.

FIG. 4 is an operational timing diagram of the decoding apparatus in the present embodiment.

Description shall be made for the case where data 104 and byte valid signals 105 can be obtained, as in FIG. 4, when the read enable signal 102 is valid for three cycles, and the read address 103 having an access unit of 32-bits, is "0", "1" and "2" respectively, for each of the three cycles. It is assumed that the marker is "FF" and the delete data is "00".

In FIG. 4, cycles are represented as C1, C2, C3, C4, C5, C6 and C7 on the basis of the clock 101.

With respect to the data 104 and the byte valid signals 105 in cycles C2, C3 and C4, the signal S311 representing the output of the FF comparison device 310 comes out as "0001", "0100" and "0000", in accordance with the byte positions of "FF" in data 104. The signal S321 representing the output of the 00 comparison device 320 comes out as "1000", "1010" and "0000", in accordance with the byte positions of "00" in data 104.

In the case where the lowest 1 byte of the data 104 is "FF", the signal S331 representing the output of the FF of the comparison result register is held for the next one cycle as the determination for delete data "00" needs to be performed for the data 104 of the next cycle.

The delete data distinguishing circuit 340 (a) receives the signal S311 outputted by the FF comparison device, the signal S321 outputted by the 00 comparison device, and the signal S331 of the FF comparison result register, (b) creates the data deletion information 332, and (c) outputs the data selection signals S341, S342, S343 and S344.

As shown in the data deletion information 332 in the cycle C3, the byte position of "00" in data value "FF00" present in the data 104 can be obtained.

The data selection signals S341, S342, S343 and S344 designates the byte to be selected by the byte data selectors 410, 420, 430 and 440, by designating the byte positions in the data 104 with "1", "2", "3", "4" from the lowest byte position.

In the case where any of the data selection signals S341, S342, S343 and S344 is "0", the bit within the 4-bit byte valid signals S402 that corresponds (to the data selection signal which is "0") is set as "0" indicating that it is invalid.

Thus, according to the aforementioned manner, the data S401 for which the "00" within the "FF00" included in encoded data has been deleted is inputted to the second decoding circuit 500.

In this manner, according to the decoding apparatus in the present embodiment, the distinguishing data "00" attached to an "FF" which is encoded data that is not a marker is deleted by the first decoding circuit in one cycle. Therefore, higher speeds can be achieved than in the deletion of distinguishing data by the processor, and the deterioration of processing speed can be prevented.

Second Embodiment

Figure 5:
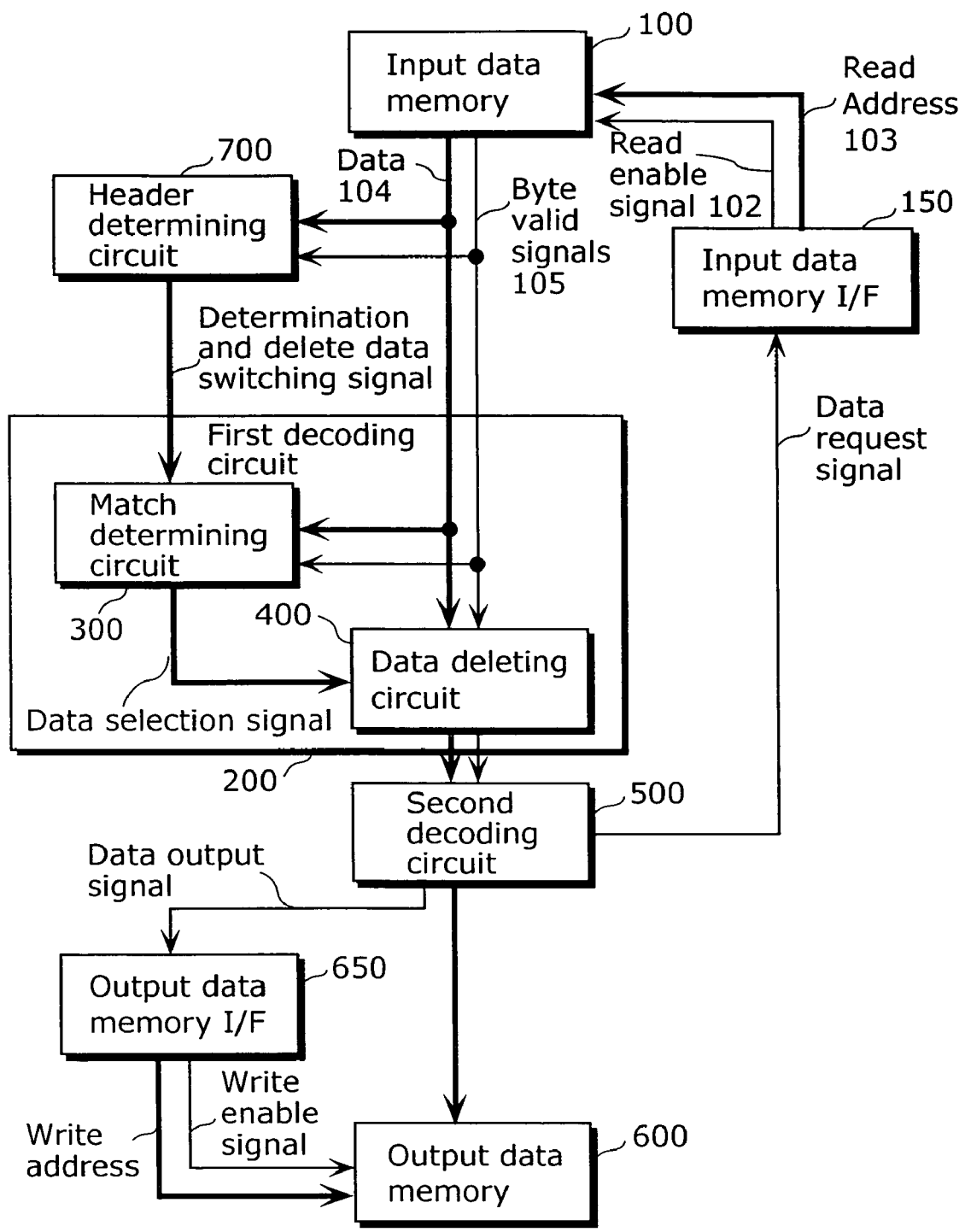
FIG. 5 shows the decoding apparatus in the second embodiment.

FIG. 5 is a diagram showing the structure of the decoding apparatus in the second embodiment of the present invention. The decoding apparatus processes encoded data that is inputted to the decoding circuit using the following: a header determining circuit which recognizes header data within the encoded data; a match determining circuit which compares data; and a data deleting circuit which deletes specific data. The specific-pattern of data to be deleted is changeable depending on the type of the encoded data.

As such, the decoding apparatus in the diagram includes an input data memory 100, an input data memory I/F 150, a first decoding circuit 200, a match determining circuit 300, a data deleting circuit 400, a second decoding circuit 500, an output data memory 600, an output data memory I/F 650 and a header determining circuit 700. Compared to the decoding apparatus in FIG. 2, this decoding apparatus is different mainly in having the header determining circuit 700 added, and in being able to switch the pattern of specific data in the match determining circuit, depending on the determination result outputted by the header determining circuit 700 and a delete data switching signal. Hereinafter, description shall be carried out centering on the points of difference, with the points of similarity being omitted.

The header determining circuit 700 receives encoded data 104 and byte valid signals 105, recognizes the header data within the data 104, distinguishes the type of such encoded data, and changes the data comparison details of the match determining circuit 300.

The match determining circuit 300 receives the data 104 and the byte valid signals 105 from the input data memory 100, obtains, by data comparison, the data to be deleted, and outputs a data selection signal to the data deleting circuit 400. The match determining circuit 300 in the present embodiment changes the bit pattern of the specific data, depending on the encoded data type determined by the header determining circuit 700. To be more specific, in the match determining circuit 300, an FF comparison device 310 and a 00 comparison device 320 not only compare "FF" and "00", respectively, but also compare a first bit sequence and a second bit sequence of the bit pattern, respectively, depending on the type of the encoded data.

The data deleting circuit 400 receives the data 104 and the byte valid signals 105 from the input data memory 100, and in accordance with the data selection signal received from the match determining circuit 300, outputs the data which has had the specific data deleted, to the second decoding circuit 500.

Figure 6:
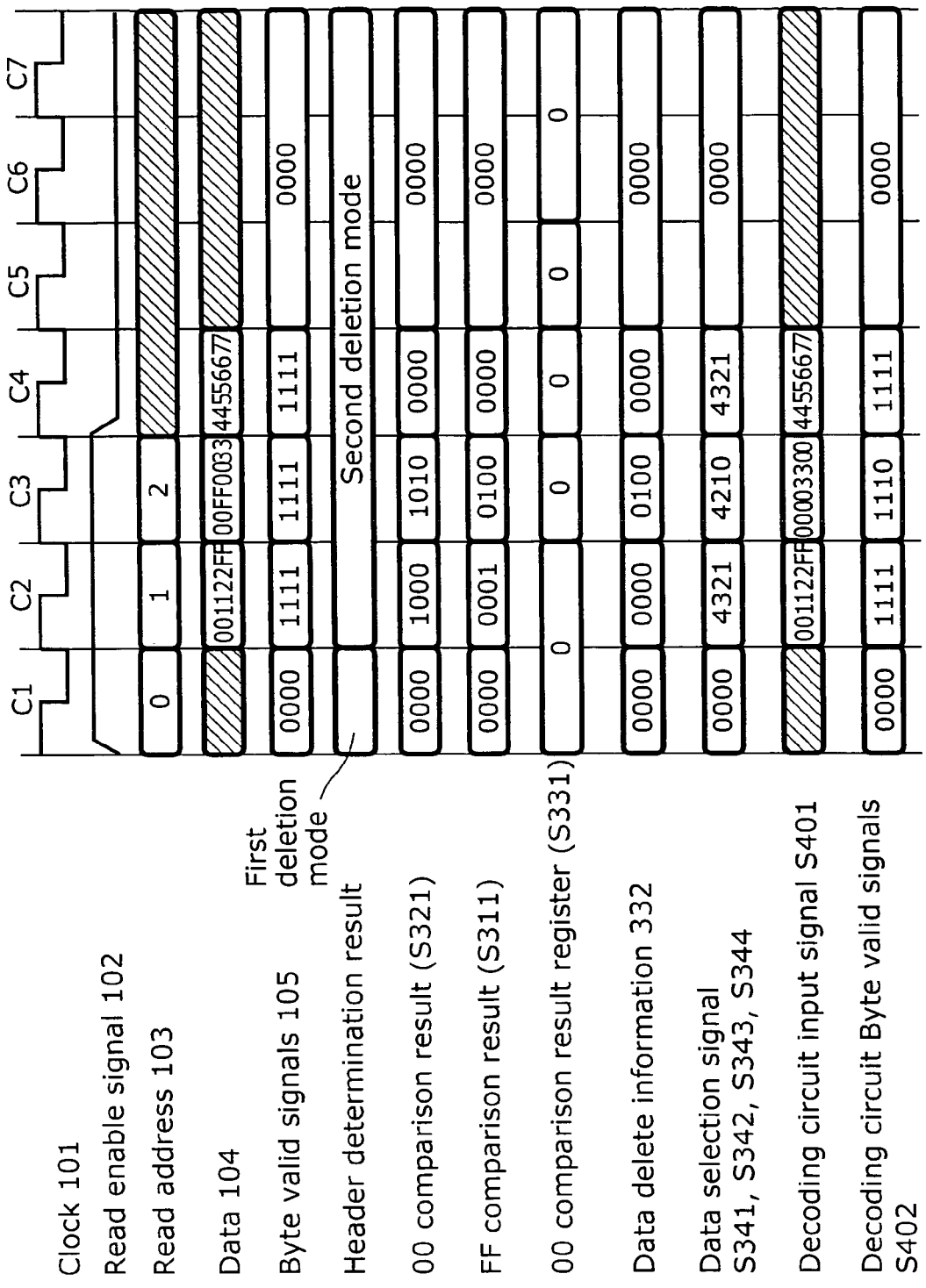
FIG. 6 is a decoding operation timing diagram.

The operation of the decoding apparatus in FIG. 5 shall be described using FIG. 6.

FIG. 6 is an operational timing diagram of the decoding apparatus in the present embodiment.

Description shall be made for the case where data 104 and byte valid signals 105 can be obtained, as in FIG. 6, when the read enable signal 102 is valid for three cycles, and the read address 103 is assumed for each of the three cycles as "0", "1" and "2", respectively.

In addition, the match determining circuit 300 has a first deletion mode and a second deletion mode which correspond to two types of encoded data. It is assumed that in the first deletion mode, marker data is "FF" and delete data is "00", and in the second deletion mode, the marker data is "00", and the delete data is "FF".

When the header determining circuit 700 determines that, with respect to the data 104 and the byte valid signals 105 in cycle C2, the type of the encoded data is for the second deletion mode, the match determining circuit 300 performs a "00" comparison for the marker comparison and an "FF" comparison for the delete data comparison.

With respect to the data 104 and the byte valid signals 105 in cycle C2, C3 and C4, the 00 comparison result, in accordance with the "00" byte position in data 104, is "1000", "1010" and "0000". The FF comparison result, in accordance with the "FF" byte position in data 104, is "0001", "0100" and "0000".

Data deletion information 332 is "0100" in cycle C3, and indicates the byte position of "FF" in the data value "00FF" present in the data 104.

Data selection signals S341, S342, S343 and S344 in cycles C2, C3 and C4 become "4321", "4210" and "4321", a signal S401 and byte valid signals S402 to be inputted to the second decoding circuit 500 is as shown in FIG. 6, and a data deletion result corresponding to the header determination for the encoded data can be obtained.

Thus, as described above, according to the decoding apparatus in the present embodiment, even in the case where, as specific data, the marker and the delete data differ depending on the type of the encoded data, the deterioration of the operating speed of the decoding circuit can be prevented as (a) the analysis of the header and (b) the setting, to the decoding circuit, of changes for the data to be compared and the data to be deleted, which are performed by the processor are eliminated by having the header determining circuit 700 distinguish the type of the encoded data and, according to this result, the marker and delete data to be compared are placed in combinations which are set for each type of encoded data.

Third Embodiment

Figure 7:
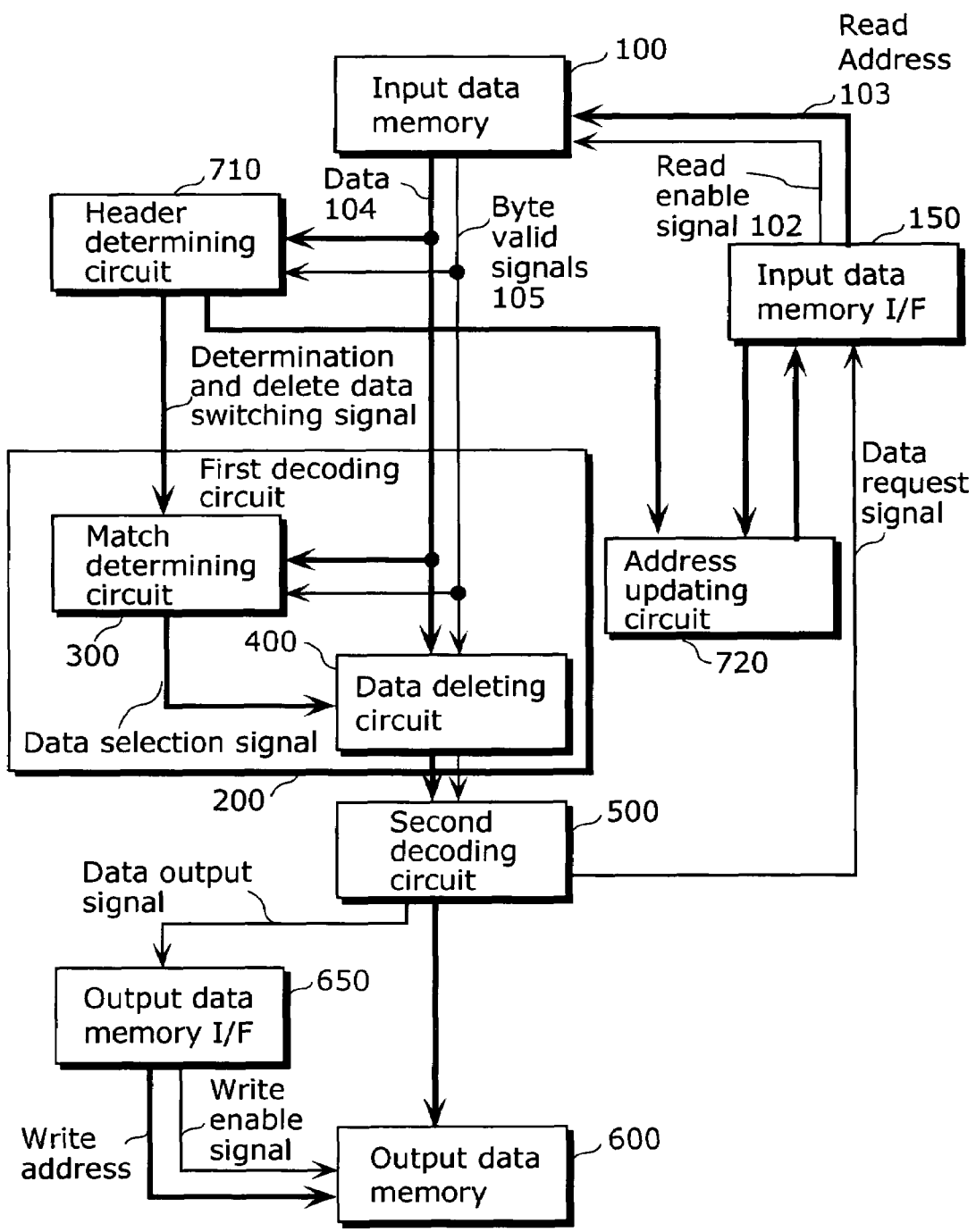
FIG. 7 shows the decoding apparatus in the third embodiment.

FIG. 7 is a diagram showing the structure of the decoding apparatus in the third embodiment of the present invention. In addition to the functions of the decoding apparatus shown in FIG. 5, this decoding apparatus is structured so that it does not read out the greater portion of header data (the part excluding the leading portion) from the input data memory 100 to the first decoding circuit 200.

The decoding apparatus shown in FIG. 7 includes an input data memory 100, an input data memory I/F 150, a first decoding circuit 200, a match determining circuit 300, a data deleting circuit 400, a second decoding circuit 500, an output data memory 600, an output data memory I/F 650, a header determining circuit 710 and an address updating circuit 720. Compared to the decoding apparatus in FIG. 5, this decoding apparatus is mainly different in (a) having the header determining circuit 710 instead of the header determining circuit 700, (b) newly including the address updating circuit 720, and (c) having the input data memory I/F 150 skip the reading of the greater portion of the header data, in accordance with the address from the address updating circuit 720. Hereinafter, description shall be carried out centering on the points of difference, with the points of similarity being omitted.

The first decoding circuit 200 receives data 104 and byte valid signals 105 from the input data memory 100, and outputs (a) the data that has had specific data deleted and (b) the byte valid signals to the second decoding circuit 500.

The header determining circuit 710 receives the data 104 and the byte valid signals 105, recognizes the header data, and along with distinguishing the type of the encoded data, outputs a header data size 711 to the address updating circuit 720. Such header data size 711 is, for example, the size resulting from the exclusion of the header itself and length data from the header data size indicated by the length data included in the leading portion of the header data. Alternatively, depending on the type of the encoded data, it can be a size equivalent to a fixed-length size excluding the leading header.

The address updating circuit 720 receives a read address of the input data memory I/F 150, and the header data size 711 outputted by the header determining circuit 710, and outputs, to the input data memory I/F 150, the result of adding the header data size 711 to the read address.

According to the abovementioned operation, the header data is recognized by the header determining circuit 710 and, in the case of header data that does not need to be provided to the second decoding circuit 500, it is possible to skip a portion of the data to be read from the input data memory 100, which is approximate to the header data. Therefore, the decoding of encoded data is sped up.

Figure 8:
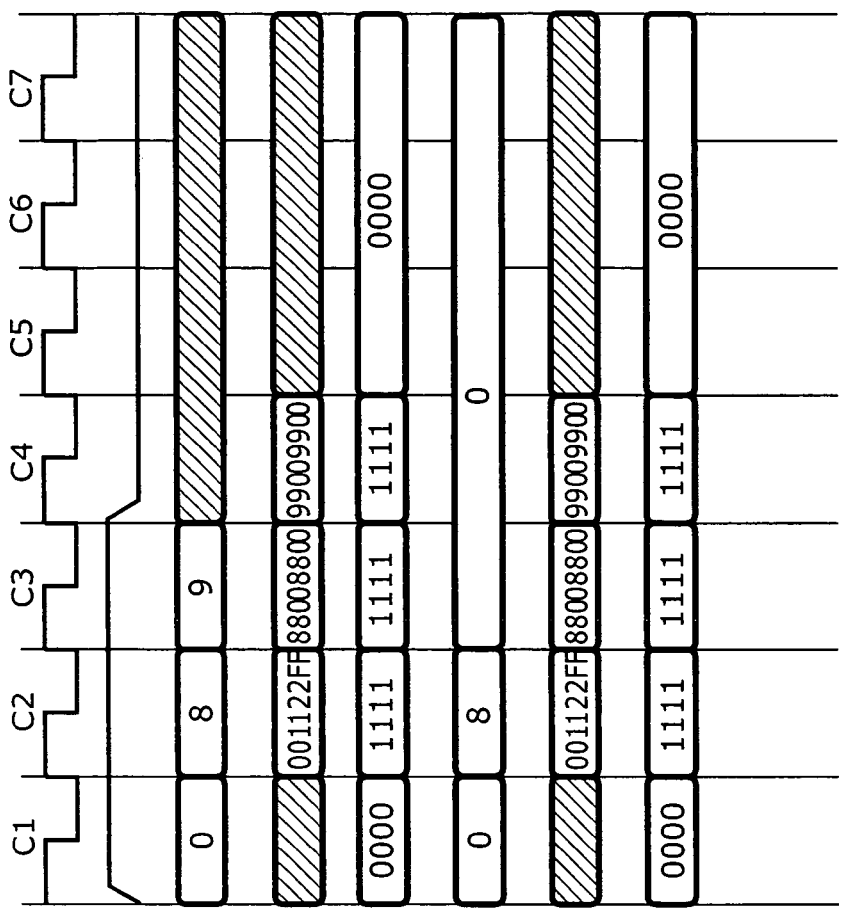
FIG. 8 is a decoding operation timing diagram.

The operation of the decoding apparatus in FIG. 7 shall be described using FIG. 8.

FIG. 8 is an operational timing diagram of the decoding apparatus in the present embodiment.

Description shall be made for the case where data 104 and byte valid signals 105 can be obtained, as in FIG. 8, when the read enable signal 102 is valid for three cycles, and the word-unit (32 bits here) read address 103 is assumed as for each of the three cycles as "0", "8" and "9", respectively.

The data 104 in cycle C2 that is obtained when the cycle C1 read address 103 is "0" is "001122FF".

It is assumed that the data 104 in cycle C2 is recognized as a header by the header determining circuit 710, and putting together the data 104 in cycle C2, the header data size 711 is 8 words.

The header determining circuit 710 inputs "8" as the header data size 711 to the address updating circuit 720, in cycle C2.

In the address updating circuit 720, "8" which is the header data size 711 in cycle C2 is added to the cycle C1 read address 103 of "0", and the result of adding "8" is outputted to the input data memory I/F 150.

The input data memory I/F 150 outputs the address value "8" inputted by the address updating circuit 720, as the read address 103 in cycle C2.

The data 104 in cycle C3 that is obtained when the read address 103 for cycle C2 is "8" is "88008800".

In the case where the cycle C3 data 104 value "88008800" is not header data, the data 104 and the byte valid signals 105 are inputted, as is, to the second decoding circuit 500.

Because the data 104 in cycle C3 is not header data, the header data size 711 in cycle C3 becomes "0", and the read address 103 in cycle C3 becomes "9" which is the next address when 1 is added.

The data 104 in cycle C4 that is obtained when the read address 103 for cycle C3 is "9" is "99009900".

In the case where the cycle C4 data 104 value "99009900" is not header data, the data 104 and the byte valid signals 105 are inputted to the second decoding circuit 500.

As described above, according to the decoding apparatus in the present embodiment, the header determining circuit 710 determines, within the encoded data, the size of the greater portion of the header data which remains after the leading portion is excluded, and the address updating circuit 720 adds such size to the read address 103. Accordingly, it is possible to skip the read out of the greater portion of the header data, which excludes the leading portion, and the supply of encoded data from the input data memory 100 to the first decoding circuit 200 can be performed more efficiently.

Fourth Embodiment

Figure 9:
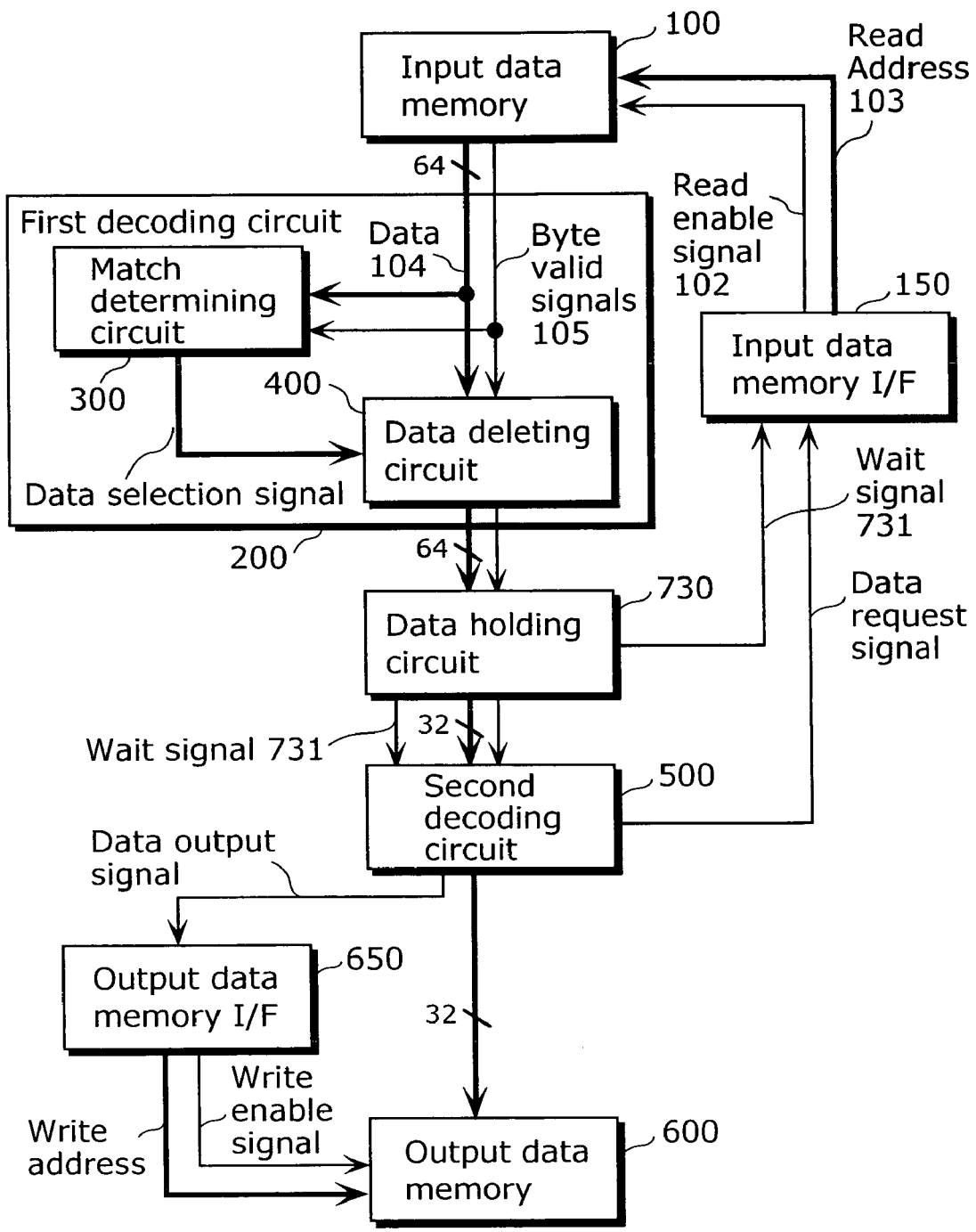
FIG. 9 shows the decoding apparatus in the fourth embodiment.

FIG. 9 is a diagram showing the structure of the decoding apparatus in the fourth embodiment of the present invention. This decoding apparatus is structured with a data bus width, from the input data memory 100 to the first decoding circuit 200, that is widened to 64 bits, so as to eliminate shortage of data even after the data deletion performed by the first decoding circuit 200, and allow transmission from the first decoding circuit 200 to the second decoding circuit 500 without delays.

The decoding apparatus shown in FIG. 9 includes an input data memory 100, an input data memory I/F 150, a first decoding circuit 200, a match determining circuit 300, a data deleting circuit 400, a second decoding circuit 500, an output data memory 600, an output data memory I/F 650, and a data holding circuit 730. Compared to the decoding apparatus in FIG. 2, the decoding apparatus shown in the diagram is mainly different in (a) having the number of bits for the internal processing in the input data memory 100 and the first decoding circuit 200 increased from 32 to 64, and (b) newly including the data holding circuit 730. Hereinafter, description shall be carried out centering on the points of difference, with the points of similarity being omitted.

The data bus between the input data memory 100 and the first decoding circuit 200 is 64 bits wide.

The input data memory I/F 150 transmits 64-bit data from the input data memory 100 to the first decoding circuit 200 in the case where the data request signal from the second decoding circuit 500 is active and the wait signal from the data holding circuit 730 is inactive.

The first decoding circuit 200 receives a 64-bit data 104 and 8-bit byte valid signals 105 from the input data memory 100, and outputs, to the data holding circuit 730, the data after specific data has been deleted, and the byte valid signals.

The data holding circuit 730 holds the data received from the first decoding circuit 200, adjusts the data size to the width of the data bus towards the second decoding circuit 500, and supplies the data to the second decoding circuit 500.

When subsequent data 104 cannot be accepted due to the amount of the data received from the first decoding circuit 200 that is being held by the data holding circuit 730, the data holding circuit 730 outputs a wait signal 731 to the second decoding circuit 500 to negate the data request signal to the input data memory I/F 150.

Figure 10:
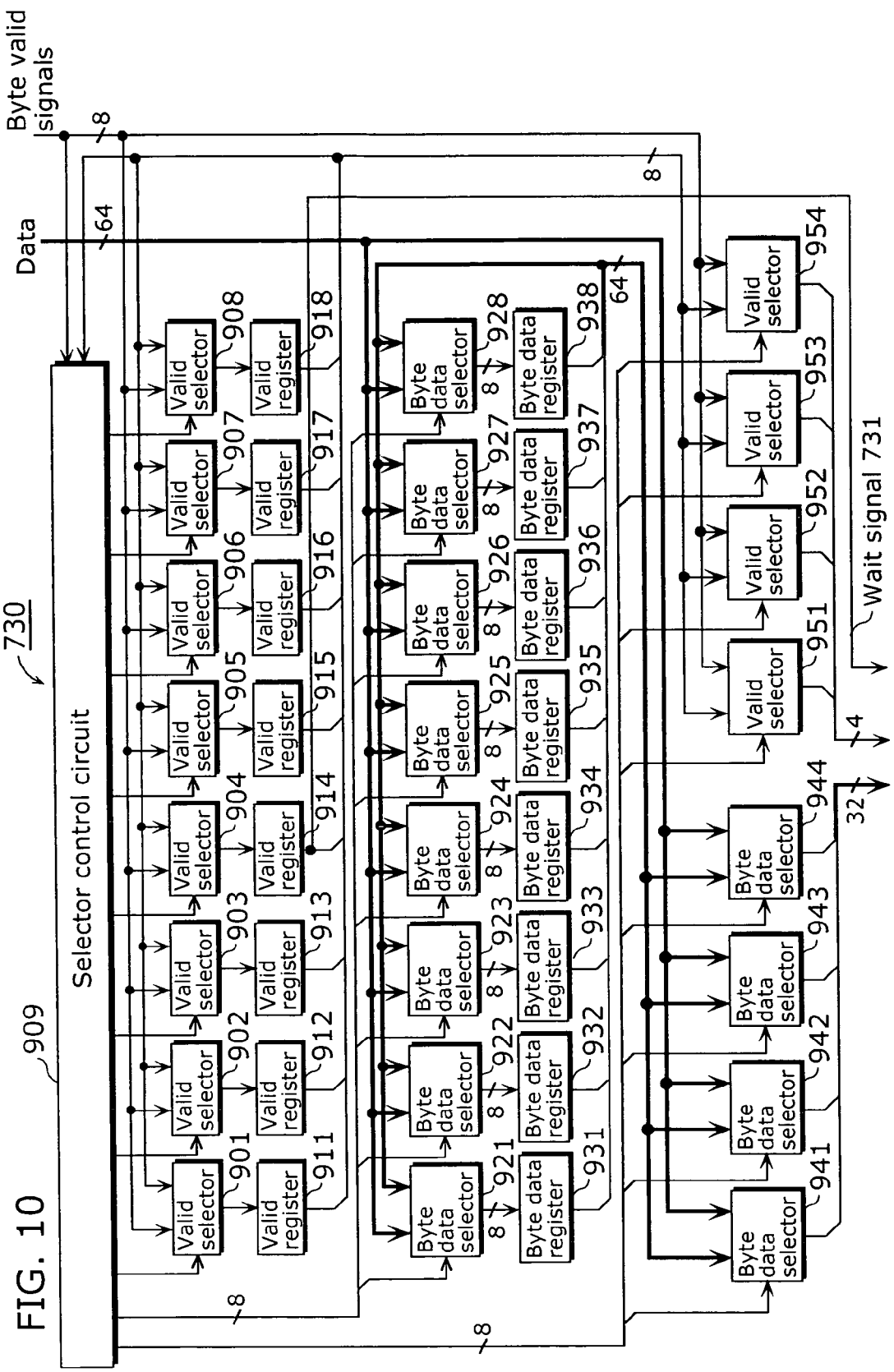
FIG. 10 is a structure diagram of the data holding circuit.

FIG. 10 is a block diagram showing a detailed example of the structure of the data holding circuit 730. The data holding circuit 730 includes a selector control circuit 909, eight valid selectors 901 to 908, eight valid registers 911 to 918, eight byte data selectors 921 to 928, eight byte data registers 931 to 938, four byte data selectors 941 to 944, and four valid selectors 951 to 954.

The eight byte data registers 931 to 938 holds 8-byte data received from the first decoding circuit 200 via the eight byte data selectors 921 to 928, and outputs data to the second decoding circuit 500 via the four byte data selectors 941 to 944.

The eight valid registers 911 to 918 holds 8-bit byte valid signals received from the first decoding circuit 200 via the eight valid selectors 901 to 908, and outputs data to the second decoding circuit 500 via the four valid selectors 951 to 954.

Based on the 8-bit byte valid signals from the first decoding circuit 200, and the details currently held by the eight valid registers 911 to 918, the selector control circuit 909 controls the eight byte data selectors 921 to 928 so as to store valid data among the 8-byte data received from the first decoding circuit 200, into the eight byte data registers 931 to 938, starting from the lowest byte of the eight byte data registers. At the same time, based on the 8-bit byte valid signals from the first decoding circuit 200, and the details currently held by the eight valid registers 911 to 918, the selector control circuit 909 controls the eight valid selectors 901 to 908 so as to store the byte valid signals which are valid from among the 8-bit byte valid signals received from the first decoding circuit 200, into the eight byte data registers 911 to 918, starting from their lowest byte.

In addition, based on the details currently held by the eight valid registers 911 to 918, the selector control circuit 909 (a) outputs 4-bytes which are valid from among the eight byte data registers 931 to 938, to the second decoding circuit 500 via the four byte data selectors 941 to 944, and (b) at the same time, outputs byte valid signals corresponding to the output data, from the eight valid registers 911 to 918, to the second decoding circuit 500 via the four valid selectors 951 to 954. Furthermore, it controls the eight valid selectors 901 to 908 corresponding to the valid byte valid signals outputted from among the eight valid registers 911 to 918, so as to output invalid instead of valid. As such, in the case where the valid register 914 which is the fifth byte from the lowest is active, it means that there is at least 1 byte of valid data that is not yet outputted. Therefore, the output of the valid register 914 may be used as the wait signal 731 to the input data memory I/F 150.

Figure 11:
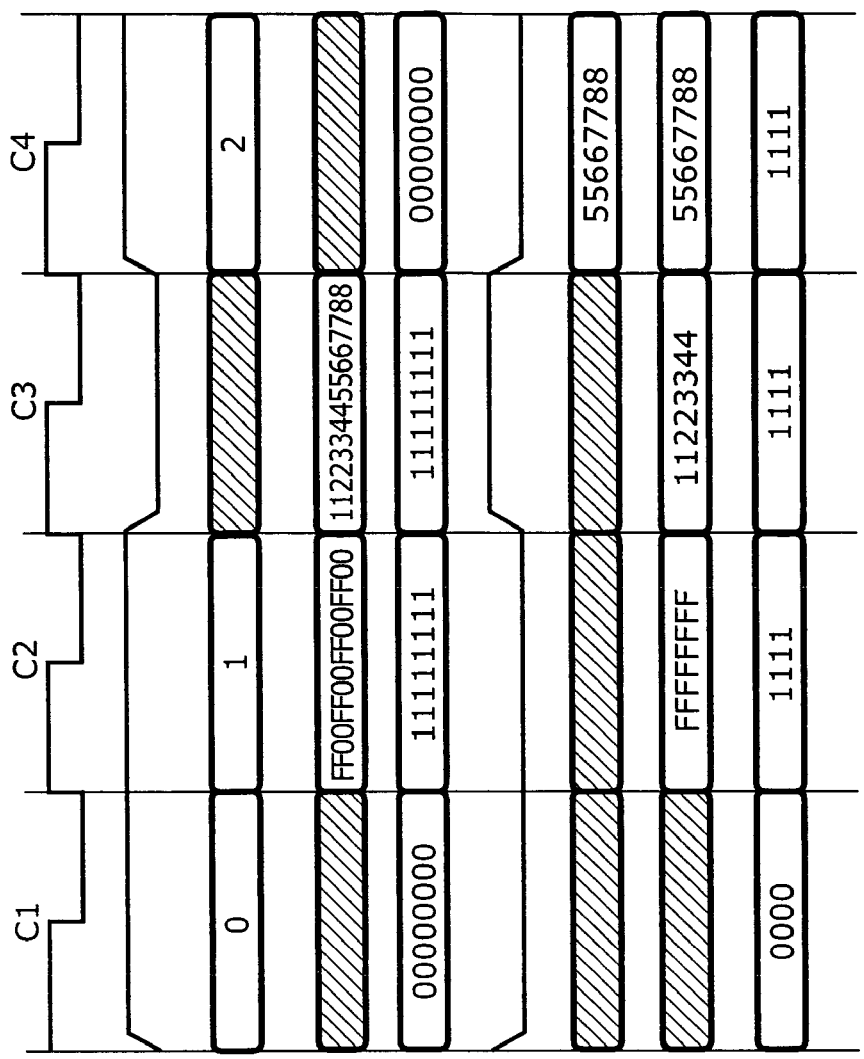
FIG. 11 is a decoding operation timing diagram.

FIG. 11 is an operational timing diagram of the decoding apparatus in the present embodiment.

Description shall be made for the case where data 104 and byte valid signals 105 can be obtained, as in FIG. 11, when the read enable signal 102 in cycle C1 and C2 is valid, and the read address 103 is assumed for each of the two cycles as "0" and "1", respectively.

In addition, it is assumed that marker data is "FF" and delete data is "00".

The data 104 in cycle C2 that is obtained when the read address 103 in cycle C1 is "0" is "FF00FF00FF00FF00".

The data 104 in cycle C2 has the "00" deleted from "FF00" by the first decoding circuit 200 and becomes "FFFFFFFF" and is inputted to the data holding circuit 730.

The data holding circuit 730 outputs data that can be accepted by the second decoding circuit 500, from the "FFFFFFFF" data received from the first decoding circuit 200.

As the width of data to be inputted to the first decoding circuit 200 is twice the width of data to be inputted to the second decoding circuit 500, even when the "00" in "FF00" is deleted and data is fully reduced, it is still possible to supply the maximum data that can be received by the second decoding circuit 500.

"FFFFFFFF" which is the signal S401 to be inputted to the decoding circuit in cycle C2 is inputted to the second decoding circuit 500.

Next, the data 104 in cycle C3 that is obtained when the read address 103 for cycle C2 is "1" is "1122334455667788".

The data 104 in cycle C3 is inputted, as is, to the data holding circuit 730 as there is no data to be deleted in the first decoding circuit 200.

From the data "1122334455667788" obtained from the first decoding circuit 200, the data holding circuit 730 outputs the data "11223344" that can be accepted by the second decoding circuit 500, and holds the remaining data "55667788".

"11223344" which is the signal S401 to be inputted to the decoding circuit in cycle C3 is inputted to the second decoding circuit 500.

Furthermore, in cycle C3, the data held by the data holding circuit 730 becomes "55667788" and is held over for the subsequent cycle 4.

As it holds the maximum number of data that can be outputted to the second decoding circuit 500, the data holding circuit 730 asserts the wait signal 731 outputted to the second decoding circuit 500, and stops the input of data 104 to the first decoding circuit 200 in cycle 4.

According to the decoding apparatus in the present embodiment, by making the width of the data bus of the input data memory 100 and the first decoding circuit 200 greater than the width of the input data bus of the second decoding circuit 500, and providing the data holding circuit 730 between the first decoding circuit 200 and the second decoding circuit 500 and having the data holding circuit 730 adjust the data size, and generate a wait signal to the input data memory I/F 150 accordingly, the deterioration in the throughput of data inputted to the second decoding circuit 500 is eliminated even in the case where a considerable amount of data deletion is performed by the first decoding circuit 200.

Moreover, although description is made for the case where the width of the data bus of the input data memory 100 is twice the width of the data bus to the second decoding circuit 500, as long as the width of the data bus of the input data memory 100 is greater than the width of the data bus to the second decoding circuit 500, the same effect can be obtained.

Fifth Embodiment

Figure 12:
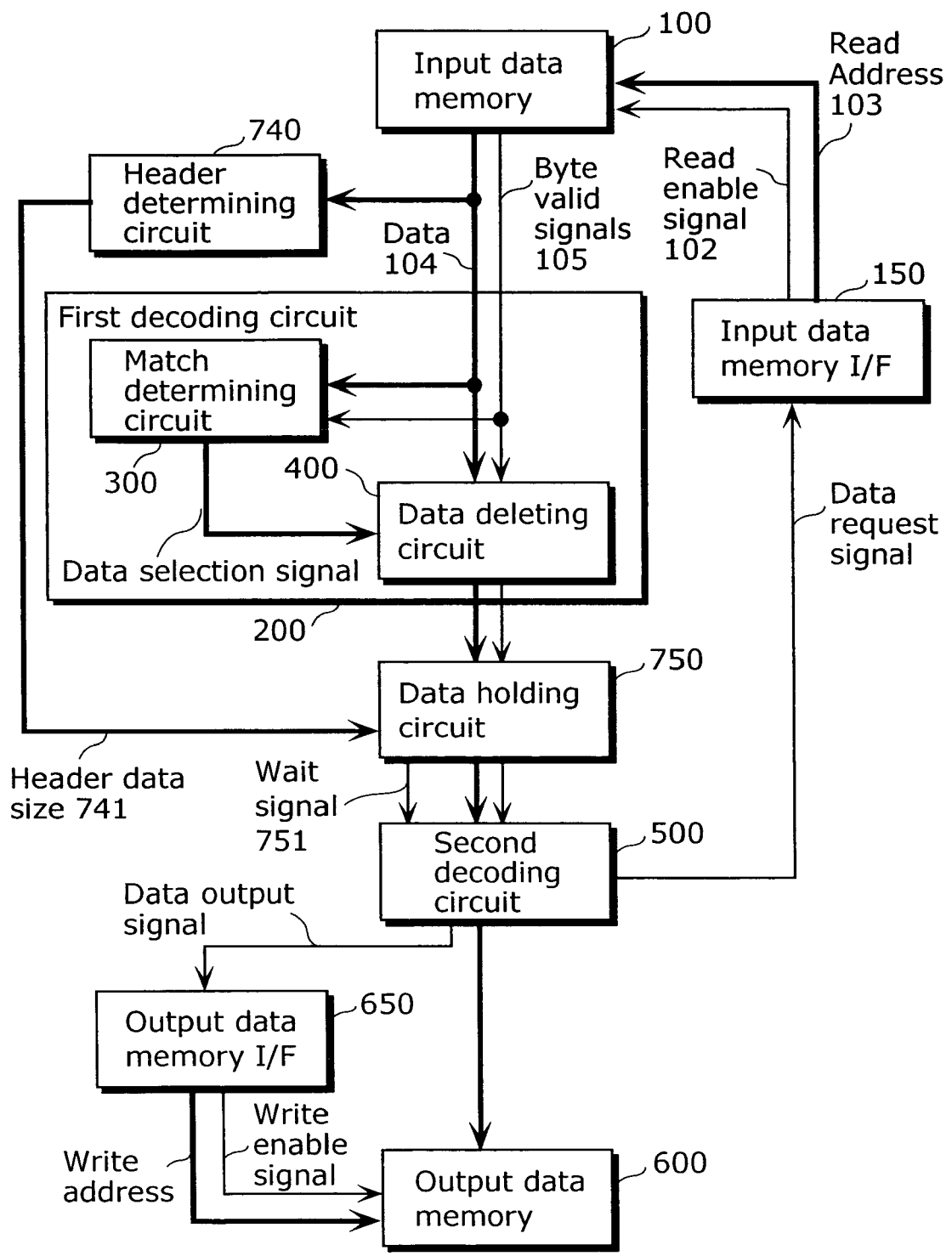
FIG. 12 shows the decoding apparatus in the fifth embodiment.

FIG. 12 is a diagram showing the structure of the decoding apparatus in the fifth embodiment of the present invention. In addition to the functions of the decoding apparatus shown in FIG. 9, this decoding apparatus is structured so as to delete header data in a data holding circuit in the case where a second decoding circuit 500 will not decode the header data.

The decoding apparatus in FIG. 12 includes an input data memory 100, an input data memory I/F 150, a first decoding circuit 200, a match determining circuit 300, a data deleting circuit 400, the second decoding circuit 500, an output data memory 600, an output data memory I/F 650, a header determining circuit 740, and a data holding circuit 750. Compared to the decoding apparatus in FIG. 9, the decoding apparatus shown in the diagram is mainly different in having the newly added header determining circuit 740, and including the data holding circuit 750 instead of the data holding circuit 730. Hereinafter, description shall be carried out centering on the points of difference, with the points of similarity being omitted.

The header determining circuit 740 receives data 104 and byte valid signals 105 from the input data memory 100, recognizes the header data, and outputs a header data size 741 to the data holding circuit 750.

The data holding circuit 750 receives the header data together with the encoded data from the first decoding circuit 200. As the data holding circuit 750 holds 8 bytes, which is larger than the 4-byte width of data to be outputted to the second decoding circuit 500, the data holding circuit 750 skips (deletes) header data equivalent to the header size received from the header determining circuit 740, and outputs the remainder to the second decoding circuit 500. Accordingly, the second decoding circuit 500 is relieved of the header deletion process, and the deterioration of processing performance can be prevented.

Figure 13:
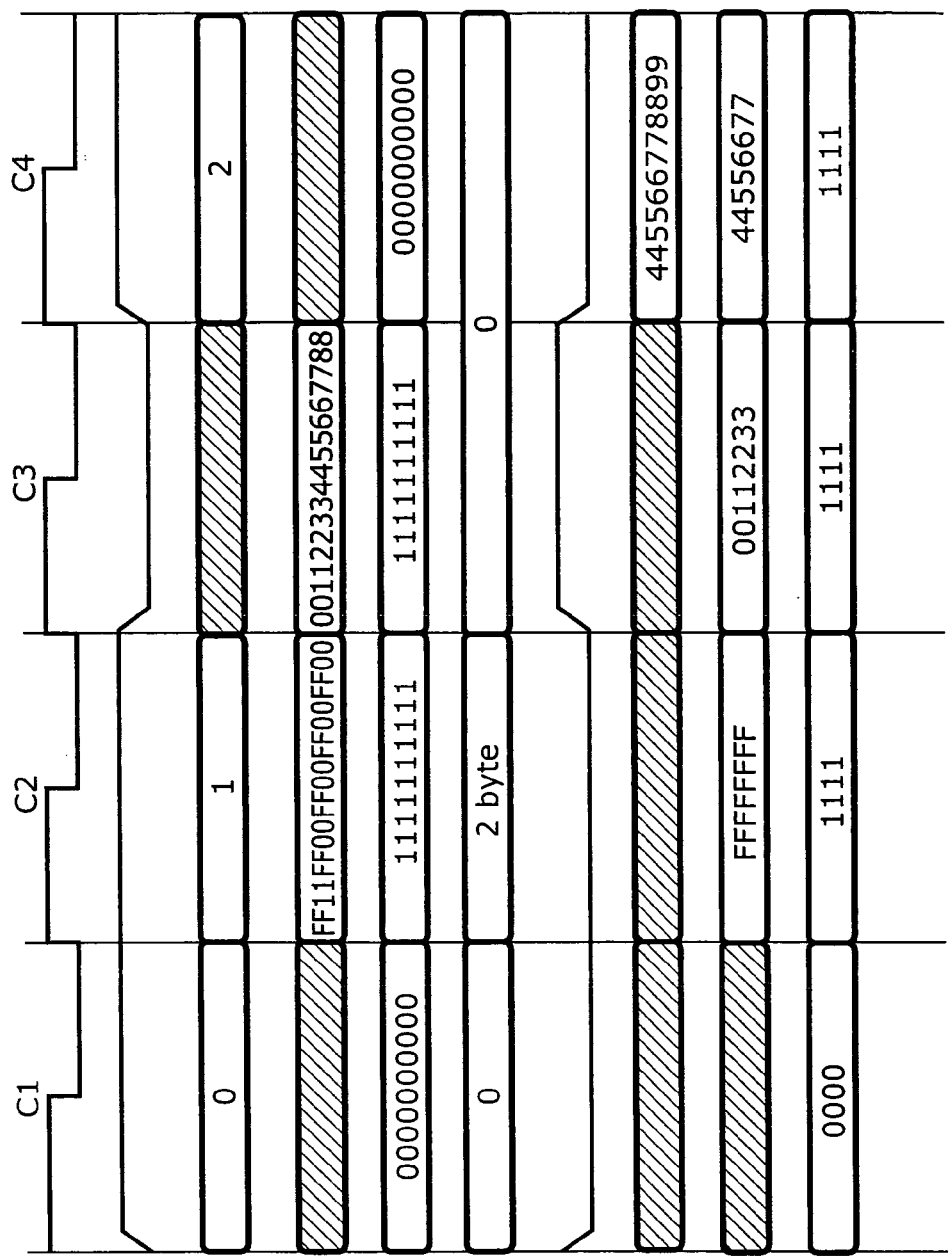
FIG. 13 is a decoding operation timing diagram.

FIG. 13 is an operational timing diagram of the decoding apparatus in the present embodiment.

Description shall be made for the case where data 104 and byte valid signals 105 can be obtained, as in FIG. 13, when the read enable signal 102 in cycle C1 and C2 is valid, and the read address 103 is assumed as "0" and "1" in each of the two cycles.

In addition, it is assumed that marker data is "FF" and delete data is "00".

The data 104 in cycle C2 that is obtained when the read address 103 for cycle C1 is "0" is "FF11FF00FF00FF00FF00".

The data 104 in cycle C2 has the "00" deleted from "FF00" by the first decoding circuit 200, and "FF11FFFFFFFF" is inputted to the data holding circuit 750.

Furthermore, "FF11FF00FF00FF00FF00" which is the data 104 in cycle C2, is inputted to the header determining circuit 740, and when header data "FF11" is recognized, the header data size 741 for cycle 2 becomes "2 bytes".

In accordance with the data value "FF11FFFFFFFF" received from the first decoding circuit 200 and the header data size "2 bytes" received from the header determining circuit 740, the data holding circuit 750 outputs the data that can be accepted by the second decoding circuit 500 from "FFFFFFFF" which is the data value "FF11FFFFFFFF" excluding the header "FF11".

As the width of data to be inputted to the first decoding circuit 200 is a value of the header size added to twice the width of the data to be inputted to the second decoding circuit 500, even in the case where "00" is deleted from "FF00" and data is deleted to the fullest, and header data which is not necessary for decoding is included, it is still possible to supply the maximum data that can be received by the second decoding circuit 500.

"FFFFFFFF" which is the signal S401 to be inputted to the decoding circuit in cycle C2 is inputted to the second decoding circuit 500.

Next, the data 104 in cycle C3 that is obtained when the read address 103 for cycle C2 is "1" is "00112233445566778899".

The data 104 in cycle C3 is inputted, as is, to the data holding circuit 750 as there is no data to be deleted in the first decoding circuit 200.

From the data "00112233445566778899" obtained from the first decoding circuit 200, the data holding circuit 750 outputs the data "00112233" that can be accepted by the second decoding circuit 500, and holds the remaining data "445566778899".

"00112233" which is the signal S401 to be inputted to the decoding circuit in cycle C3 is inputted to the second decoding circuit 500.

Furthermore, in cycle C3, the data held by the data holding circuit 750 becomes "445566778899" and is held for the subsequent cycle 4.

As it holds more than the maximum number of data that can be outputted to the second decoding circuit 500, the data holding circuit 750 asserts the wait signal 751 outputted to the second decoding circuit 500, and stops the input of data 104 to the first decoding circuit 200 in cycle 4.

In cycle C4, "44556677" from the data "445566778899" held by the data holding circuit 750 is outputted to the second decoding circuit 500.

Accordingly, even when data deletion is performed by the first decoding circuit 200, and the data holding circuit 750 skips the header data, the deterioration in the throughput of data inputted to the second decoding circuit 500 is eliminated.

Sixth Embodiment

Figure 14:
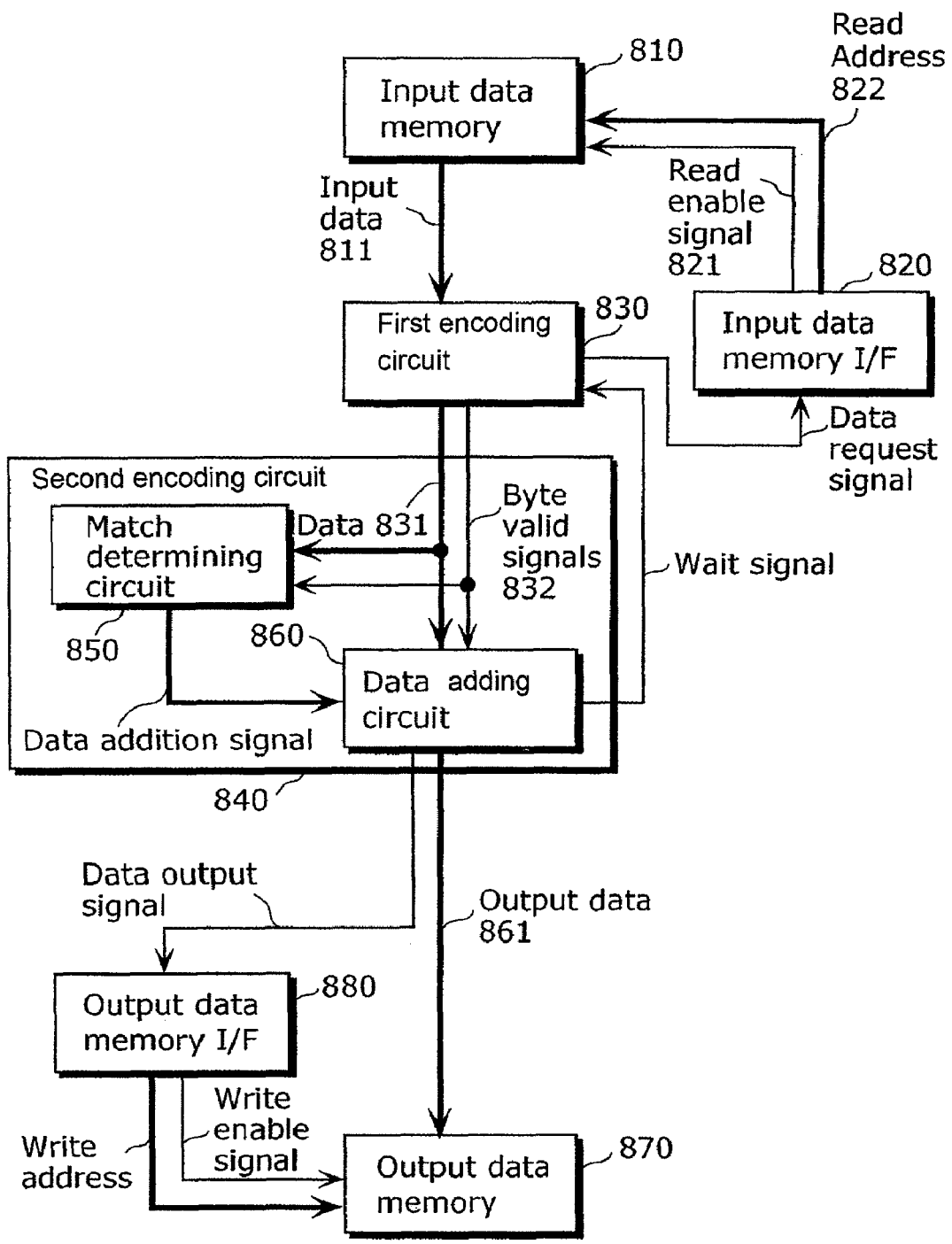
FIG. 14 shows the encoding apparatus in the sixth embodiment.

FIG. 14 is a diagram showing the structure of the encoding apparatus in the sixth embodiment of the present invention. The encoding apparatus (a) processes encoded data outputted by an encoding circuit, using a match determining circuit which compares data, and a data adding circuit which inserts specific data, and (b) inserts data having a specific pattern.

The encoding apparatus in FIG. 14 includes an input data memory 810, an input data memory I/F 820, a first encoding circuit 830, a second encoding circuit 840, a match determining circuit 850, a data adding circuit 860, an output data memory 870, and an output data memory I/F 880. In the present embodiment, the width of the data bus between the input data memory 810 and the first encoding circuit 830, as well as between the first encoding circuit 830 and the second encoding circuit 840 is 32 bits. The width of the data bus between the second encoding circuit 840 and the output data memory 870 is assumed as 32 bits. However, inside the data adding circuit 860, processing is possible up to the 64-bit data arising from data addition.

The input data memory 810 stores sound and image data to be encoded.

The input data memory I/F 820 outputs a read enable signal 821 and a read address 822 to the input data memory 810, in accordance with a data request signal of the first encoding circuit 830. The input data memory 810 receives the read enable signal 821 and the read address 822 from the input data memory I/F 820, and outputs input data 811 to the first encoding circuit 830.

The first encoding circuit 830 outputs, to the second encoding circuit 840, data 831 which is the encoding result, and byte valid signals 832 which are valid signals for each byte.

The second encoding circuit 840 (a) receives the data 831 and the byte valid signals 832 from the first encoding circuit 830, (b) outputs an output data 861 to the output data memory 870 after adding specific information inside the encoded data, and (c) outputs, to the output data memory I/F 880, a data output signal which indicates that the output data 861 is valid.

The second encoding circuit 840 is made up of the match determining circuit 850 and the data adding circuit 860.

The match determining circuit 850 (a) receives the data 831 and the byte valid signals 832 from the first encoding circuit 830, (b) obtains, by data comparison, the specific data requiring data addition, and (c) outputs, to the data adding circuit 860, a data addition signal which indicates the position to which data is to be added.

The data adding circuit 860 receives the data 831 and the byte valid signals 832 from the first encoding circuit 830, and in accordance with the data addition signal received from the match determining circuit 850, outputs, to the output data memory 870, output data 861 to which the specific data has been added.

The second encoding circuit 840 outputs encoding result data 831 to the output data memory 870, and outputs, to the output data memory I/F 880, a data output signal which indicates that the encoding result data is valid.

The output data memory I/F 880 outputs a write enable signal and a write address to the output data memory 870, in compliance with the data output signal outputted by the second encoding circuit 840.

Figure 15:
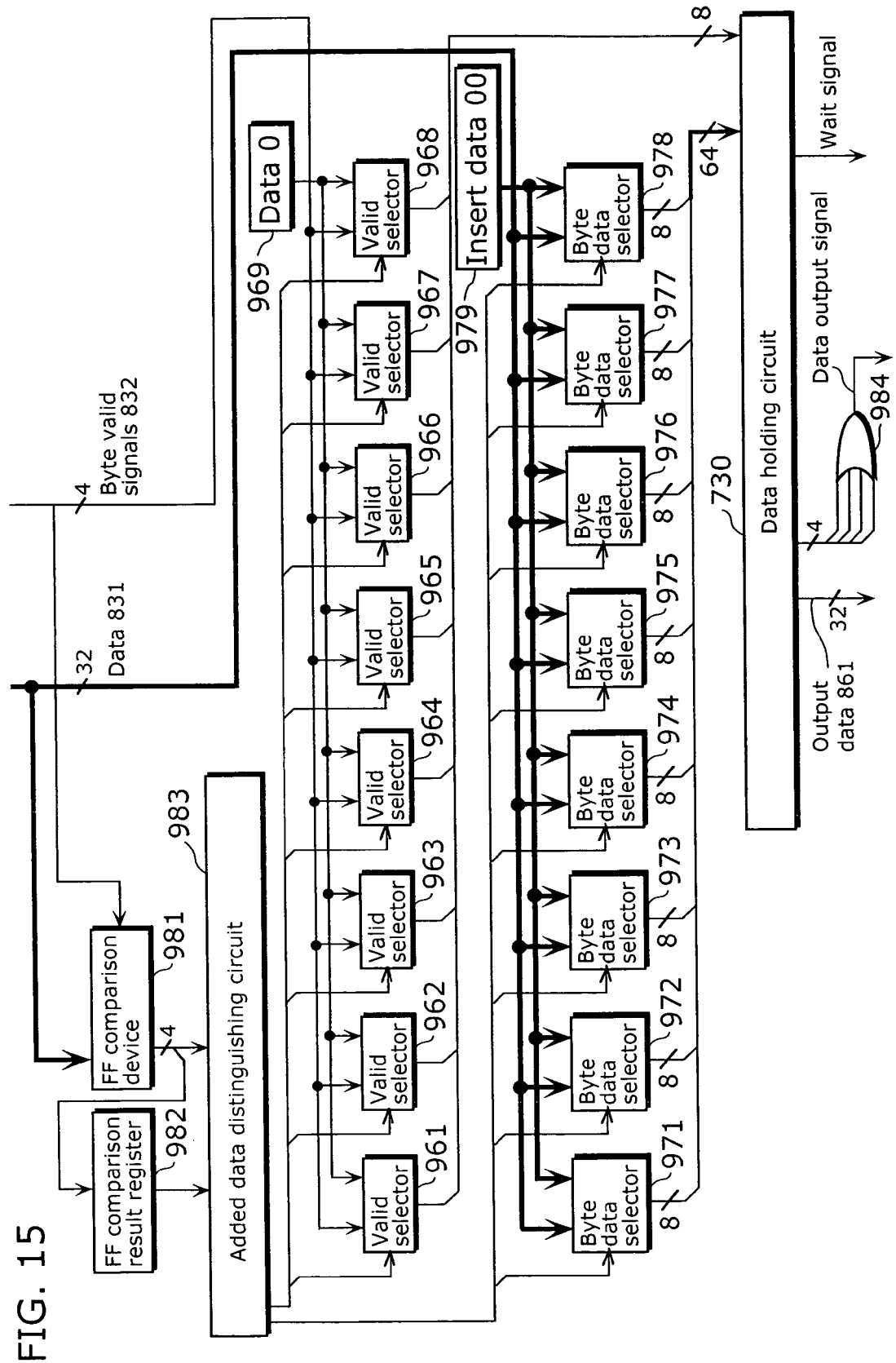
FIG. 15 is a structure diagram of the match determining circuit and the data adding circuit.

FIG. 15 is a block diagram showing a detailed example of the structure of the match determining circuit 850 and the data adding circuit 860. The match determining circuit 850 includes an FF comparison device 981, an FF comparison result register 982, an added data distinguishing circuit 983, eight valid selectors 961 to 968, and a zero holding unit 969. The data adding circuit 860 includes byte data selectors 971 to 978, an insert data holding unit 979, a data holding circuit 730, and an OR circuit 983.

With respect to the 4-byte encoded data received from the first encoding circuit 830, the FF comparison device 981 compares, for each byte, whether or not there is a match with the marker bit pattern "FF", and outputs the comparison result, as a 4-bit signal, to the added data distinguishing circuit 983.

The FF comparison result register 982 holds the comparison result for the lowest byte, from among the comparison results for the previous cycle.

The added data distinguishing circuit 983 adds a valid 1-bit valid data signal to the low-side byte position of byte data that matches the bit pattern of the marker. The valid valid data signal to be added indicates the byte position to which distinguishing data should be added. In addition, from among the byte data selectors 971 to 978, the added data distinguishing circuit 983 controls the byte data selector corresponding to the byte position indicated by the valid valid data signal to be added, so as to select an insert data "00". At the same time, among the byte data selectors 971 to 978, the byte data selectors for the byte positions indicated by valid valid data signals (valid data signals that are valid from the start) aside from the added valid valid data signal, are controlled so as to select corresponding data within the data bus 831.

The data holding circuit 730 is the same as that in FIG. 10, and adjusts the data size of data having a maximum of 8 bytes to data having a maximum of 4 bytes each, and outputs the adjusted result.

Figure 16:
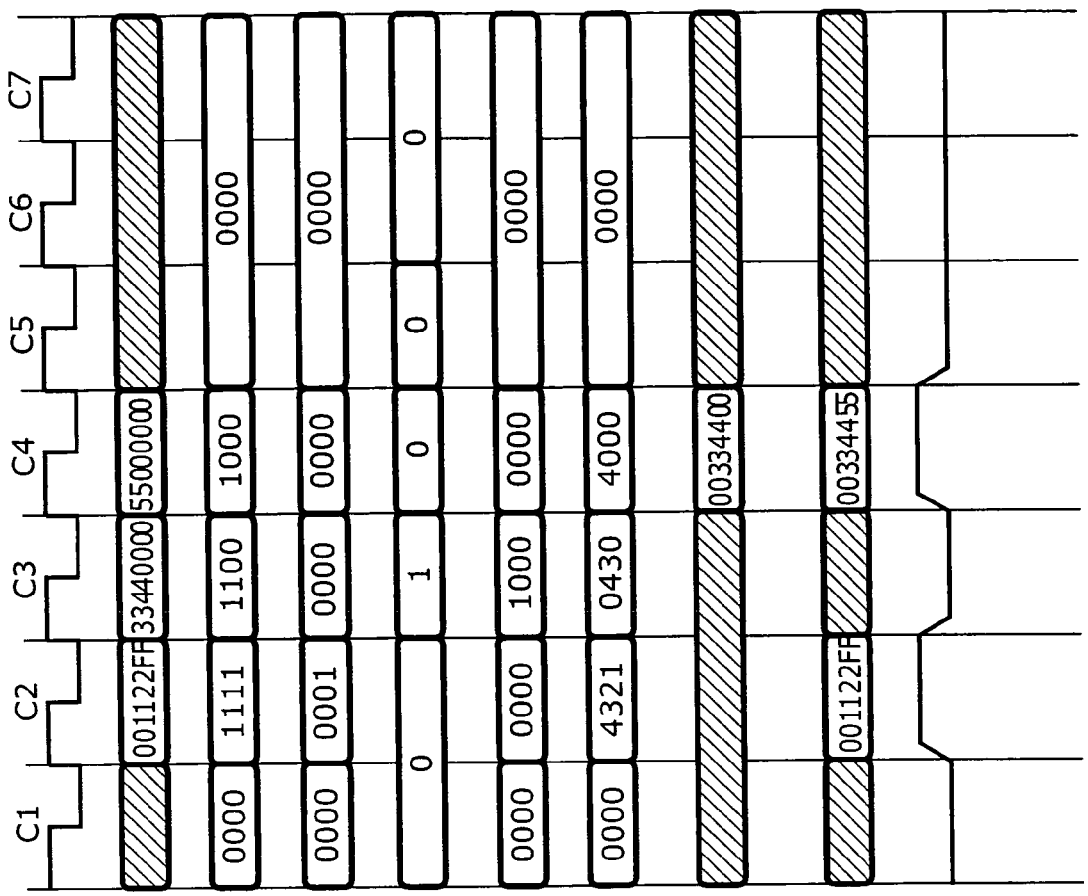
FIG. 16 is an encoding operation timing diagram.

FIG. 16 is an operational timing diagram of the encoding apparatus in the present embodiment.

Description shall be made for the case where the data 831 and the byte valid signals 832 outputted by the first encoding circuit 830 in cycles C2, C3 and C4 are obtained in the manner shown in FIG. 16.

In addition, it is assumed that marker data is "FF" and added data is "00".

With respect to the data 831 and the byte valid signals 832 in cycles C2, C3 and C4, the FF comparison result 851, in accordance with the byte position of "FF" in data 831, is "0001", "0000" and "0000".

In the case where the lowest 1 byte of the data 831 is "FF", the FF comparison result register 982 holds it, as "00" data addition needs to be performed on the data 831 in the next cycle.

The match determining circuit 850 outputs a data addition signal 853 from the FF comparison result 851 and the FF comparison result register 852.

As indicated by the data addition signal 853 in cycle C3, the byte position of data value "FF" which is present in the data 831 can be obtained.

The data adding circuit 860 receives the data 831 and the byte valid signals 832 as well as the data addition signal 853, and inserts added data "00" into the data 831, in the byte position indicated by the data addition signal 853.

In addition, the data adding circuit 860 holds the data that has been inserted with the additional data "00", and outputs, to the output data memory 870, data that has attained the data width of the output data memory 870.

In other words, with respect to the valid data "001122FF", "3344" and "55" in cycles C2, C3 and C4, respectively, the data addition signal 853 is "0000", "1000" and "0000".

In cycle C2, the data 831 value "001122FF" becomes the output data 861, and the data output signal 862 is asserted.

In cycle C3, "00" data is added to the valid data "3344" of data 831 and "003344" is obtained. However, this is held for the next cycle as the data width of the output data memory 870 has not been attained, and the data output signal 862 is negated.

In cycle C4, the valid data "55" of data 831 is obtained and by being attached to the data "003344" held from cycle C3, data "00334455" is obtained. This becomes the output data 861 and the data output signal 862 is asserted.

According to the encoding apparatus in the present embodiment, the data input and output processes between the memory and the processor, as well as the insertion process performed by the processor are eliminated, as the processor does not need to carry out the insertion of distinguishing data indicating a non-marker, with respect to data within the encoded data, having the same bit pattern as the marker, and the insertion process can be carried out in one cycle. Therefore, the deterioration of operating speed of the encoding circuit can be prevented.

In addition, as data shortages for the data bus outputting to a memory holding encoded data are eliminated, even in the case where distinguishing data is inserted into the encoded data, the deterioration of the encoding process throughput caused by waiting for the transmission of data can be prevented.

In order that the throughput of data to be supplied to the decoding circuit and encoding circuit does not deteriorate, the decoding apparatus and the encoding apparatus in the present invention includes (a) a circuit which determines the encoded data, and performs the deletion and addition of data, and (b) a circuit which subsequently performs decoding and encoding, and are useful for speeding up the decoding and encoding of sound and image data.

Furthermore, the decoding apparatus and the encoding apparatus in the present invention can also be applied to data conversion applications such as data compression and data expansion.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A decoding apparatus comprising:

a memory operable to hold encoded data representing one of a compressed sound and a compressed image;

a memory read-out unit operable to sequentially read out the encoded data from said memory;

a match determining circuit operable to determine whether or not data matching a specific bit sequence exists in the encoded data read out by said memory read-out unit:

a deleting circuit operable to delete a part of the specific bit sequence from the encoded data read out from said memory, when said match determining circuit determines that the specific bit sequence exists;

a decoding circuit operable to decode the post-deletion encoded data; and a holding circuit placed between said deleting circuit and said decoding circuit, and operable to temporarily hold the post-deletion encoded data, wherein said memory read-out unit is operable to read out the encoded data on a first bus width basis, an input bus width of said decoding circuit is a second bus width which is narrower than the first bus width, and said holding circuit is operable to hold the post-deletion encoded data, to adjust the held encoded data to the second bus width, and to output the adjusted encoded data to said decoding circuit.

2. The decoding apparatus according to claim 1, further comprising a size determining circuit operable to determine a size of a header included in the encoded data read out from said memory, wherein said holding circuit is further operable to delete the header from the held encoded data, depending on the size determined by said size determining circuit.

3. The decoding apparatus according to claim 2, wherein the specific bit sequence includes a first bit sequence and a second bit sequence which is added to the first bit sequence, and said deleting circuit is operable to delete the second bit sequence.

4. The decoding apparatus according to claim 3, wherein said match determining circuit includes:

a first comparison device operable to compare the encoded data with the first bit sequence on a first predetermined size basis, the encoded data being read out from said memory;

a second comparison device operable to compare the encoded data with the second bit sequence on a second predetermined size basis, the encoded data being read out from said memory; and a register operable to hold at least a part of a comparison result, from said first comparison device, for encoded data read out one cycle earlier.

5. The decoding apparatus according to claim 4, wherein said deleting circuit includes:

a distinguishing circuit operable to distinguish the specific bit sequence from comparison results from said first comparison device and said second comparison device, and the comparison result held by said register; and a selecting circuit operable to partially select and output the encoded data, so as to exclude the second bit sequence from the distinguished specific bit sequence, the encoded data being read out from said memory.

6. An encoding apparatus comprising:

a first memory operable to hold data to be encoded;

a memory read-out unit operable to sequentially read out the data to be encoded from said first memory;

an encoding circuit operable to encode the data read out from said first memory;

a match determining circuit operable to determine whether or not data matching a specific bit sequence exists in the encoded data outputted by said encoding circuit;

an adding circuit operable to add a predetermined bit sequence to the encoded data outputted by said encoding circuit, when said match determining circuit determines that the specific bit sequence exists; and a second memory operable to store the post-addition encoded data;

wherein a bus width of said second memory is greater than an output bus width of said encoding circuit, and said adding circuit is operable to hold the encoded data outputted by said encoding circuit, and to adjust the size of the held encoded data to the bus width of said second memory.

7. The encoding apparatus according to claim 6, wherein said match determining circuit is operable to compare the encoded data with the specific bit sequence, on a first predetermined size basis, the encoded data being outputted by said encoding circuit; and said adding circuit is operable to add the predetermined bit sequence immediately after the specific bit sequence within the encoded data, based on the comparison result from said match determining circuit.

* * * * *

UNITED STATES PATENT AND TRADEMARK OFFICE
CERTIFICATE OF CORRECTION

PATENT NO. : 7,668,381 B2  Page 1 of 1
APPLICATION NO. : 11/253683
DATED : February 23, 2010
INVENTOR(S) : Masumoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Twenty-eighth Day of December, 2010

David J. Kappos
*Director of the United States Patent and Trademark Office*